United States Patent [19]

Alwerud

[11] Patent Number: 4,595,125
[45] Date of Patent: Jun. 17, 1986

[54] APPARATUS AND METHOD FOR DISPENSING A PREDETERMINED WEIGHT PER UNIT OF TIME OF NONFREE-FLOWING PARTICULATE MATERIAL

[76] Inventor: S. Tomas Alwerud, 8031 La Jolla Scenic Dr., La Jolla, Calif. 92037

[21] Appl. No.: 546,396

[22] Filed: Oct. 28, 1983

[51] Int. Cl.$^4$ .............................................. G01G 11/12
[52] U.S. Cl. ........................................ 222/55; 222/63; 198/505; 177/121
[58] Field of Search ...................... 222/55, 56, 63, 412, 222/415, 252; 198/505, 504, 575; 177/50, 120, 121; 194/10

[56] References Cited

U.S. PATENT DOCUMENTS

| | | | |
|---|---|---|---|
| 2,549,908 | 4/1951 | Johansen | 198/504 X |
| 2,662,665 | 12/1953 | Harper | 222/55 |
| 2,763,399 | 9/1956 | Heacock | 222/55 |
| 3,001,672 | 9/1961 | Wahl | 222/55 X |
| 3,212,673 | 10/1965 | Hyde | 222/59 |
| 3,430,751 | 3/1969 | Bateson | 198/505 |
| 3,985,266 | 10/1976 | Wright, Jr. | 222/55 X |
| 4,071,102 | 1/1978 | Van Ostenbridge et al. | 198/504 X |
| 4,221,507 | 9/1980 | Olney | 198/505 X |
| 4,232,781 | 11/1980 | Müller | 198/505 |
| 4,234,070 | 11/1980 | Heiman | 194/10 X |
| 4,366,872 | 1/1983 | Brunnschweiler | 222/56 X |

Primary Examiner—Joseph J. Rolla
Assistant Examiner—Nils E. Pedersen
Attorney, Agent, or Firm—Joseph C. Schwalbach

[57] ABSTRACT

An apparatus and method useful for continuously dispensing from a bulk storage bin or silo at a precise weight per unit time nonfree-flowing particulate material. A feeder capable of discharging from the back storage bin or silo a precise volume per unit time of the particulate material is positioned to deposit the material onto the conveyor of a continuous weigh scale which, like the feeder, is driven by variable speed drive motor under the control of a control circuit responsive to changes in bulk density of the particulate material sensed by the weigh scale. There is an adjustable speed ratio driving connection between the feeder and conveyor for causing the conveyor to be driven at a predetermined constant speed with respect to the speed of the feeder, and the control circuit is effective to cause shut off of the apparatus in the event that the bulk density of the particulate material exceeds predetermined minimum or maximum limits. A visual display indicates the cause of such shut down and the need for appropriate adjustment of the speed of the conveyor relative to that of the feeder.

20 Claims, 4 Drawing Figures

APPARATUS AND METHOD FOR DISPENSING A PREDETERMINED WEIGHT PER UNIT OF TIME OF NONFREE-FLOWING PARTICULATE MATERIAL

TECHNICAL FIELD

This invention relates to the field of materials handling, and more particularly it relates to apparatus and a method for continuously dispensing from a container, such as a bulk storage bin or silo, a precise weight per unit time of nonfree-flowing particulate material.

In many industrial and agricultural applications there is need for a supply, on a continuous basis, of a precise weight, per unit of time of a nonfree-flowing particulate material of the type which is typically stored in a large container, such as a bulk storage hopper or silo.

BACKGROUND OF THE ART

In the prior art, systems have been developed for the continuous dispensing of free flowing materials from storage containers. Typically, such dispensing systems have included a material storage bin having a gated opening in a lower portion thereof through which the material flows into the inlet hopper of a continuous weigh scale, and from which it flows onto the conveyor belt of the latter. The free flowing material which may, for example, be corn, wheat, oats or a granulated fertilizer, flows from the container at a relatively constant rate which is determined by the gate setting, and the conveyor belt is run at the speed necessary to transport the material across the weigh scale at the same rate. Adjustment of the weight of material dispensed per unit time is ordinarily accomplished by adjustment of the setting of the gate, which may be motorized and/or an adjustment of the speed of the conveyor belt.

The weigh scale is capable of keeping track of the flow and its changes, and eventually accounts for these when totaling them. All the weigh scales require continuous monitoring to assure that the desired set weight is maintained and does not drift off because of changes in product bulk-density or flowability.

While systems of the type just described function satisfactorily when the material being handled is of a free-flowing character, they are not suitable for use with non-free flowing materials. In fact, it is not unusual for manufacturers of continuous weigh scales to notify users that such scales are intended for use with free-flowing materials only. Nonfree-flowing materials, rather than flowing freely from a storage container, tend to be arch-forming, i.e., tend to develop a void space over the opening in the bottom of the storage bin. This void space is bounded by an arch-like or curved upper surface which is formed because of interparticle friction, and formation of such void space reduces or stops the material flow from the container. The void space, once started, tends to grow until the weight of the material thereabove exceeds the sum of the combined friction forces maintaining the arch, whereupon the arch collapses and the material again flows.

Certain materials can be free-flowing under one set of conditions and become nonfree-flowing upon a change of conditions such as, for example, a reduction in particle size, an increase in water content, or storage in a larger volume container. Typically, resistance to flow through the discharge opening of a storage container increases when the level of the material in the container is increased, the particle size of the material is reduced, the water content of the material is increased, the coarseness of the particles is increased to thereby increase the friction coefficient thereof, the output rate is reduced as by gate adjustment, or in some cases, when the material is stored for a long period of time. Examples of materials which are of the nonfree-flowing type are powered talc, hydrated lime, starch, urea, fish meal, meat meal, chocolate powder, powdered minerals, kaolin, dried beet pulp, some grass seeds, processed oats, and several animal feeds.

Various means have been used to cope with the problems inherent in the feeding of nonfree-flowing materials from storage containers. A number of such means involve vibratory apparatus which have not been entirely satisfactory because the amount of material fed thereby is subject to considerable variation. My British Pat. No. 1,153,874 discloses a feeder which employs interengaging helical screw-type feeder elements and is operable on a continuous basis to feed a constant volume of nonfree-flowing particulate material from a large storage container. This apparatus has proven to be completely reliable and has found application in a variety of fields, such as in sewerage and water treatment plants, animal feed mills, the pulp and paper industry and the food industry, wherein delivery of a constant volume per unit time is sufficient.

There are many industrial and agricultural applications in which precise weights of materials, some of which are of a nonfree-flowing character, are blended with other ingredients to produce a final product. Because of the problems with the handling of the nonfree-flowing materials, resort has been had to batch weighing of such ingredients and production of the final product on a batch basis. Needless to say, if the same final product could be produced by a continuous, rather than batchwise method, substantial savings of time and expense would result.

In addition to the problem of feeding nonfree-flowing particulate material from a storage container, there is another problem which must be coped with insofar as continuous dispensing of a specific weight of material per unit of time is concerned, and that relates to variations in the bulk density of the material. The bulk density of nonfree-flowing and other materials frequently varies from one delivery to another, and often there may be variations in bulk density within a given delivery. Because of variations in bulk density of material fed by a constant volume type feeder of the type referred to earlier herein, the weight per unit of time of material fed thereby is necessarily subject to variations which usually occur gradually, but are of a magnitude which is unacceptable in applications requiring precise weights of materials.

DISCLOSURE OF THE INVENTION

With the foregoing in mind, it is a general object of the invention to provide an apparatus and method for efficiently and on a continuous basis dispensing from a container, such as a large bulk storage bin or silo, a predetermined weight per unit time of nonfree-flowing particulate material, regardless of variations in the bulk density thereof.

A further object of the invention is to provide apparatus of the aforementioned character which utilizes a feeder capable of discharging a predetermined volume per unit of time of nonfree-flowing material from a large bulk storage container, a continuous weigh scale having a conveyor positioned to receive material discharged by the feeder, variable speed means for driving the feeder and conveyor at predetermined relative speeds, and computer type control means for increasing or decreasing the speed of the drive means, and thereby of the feeder and conveyor, responsive to small changes in weight of material sensed by the weigh scale.

Another object of the invention is to provide apparatus as aforedescribed wherein the feeder and weigh scale conveyor are driven by a single variable speed motor, and there is a driving connection between the feeder and conveyor having means for adjusting the relative speeds thereof.

A further object of the invention is to provide apparatus as set forth herein having means for shutting off the drive means responsive to a predetermined underweight or overweight condition sensed by the weigh scale and having means for indicating the need for predetermined adjustment of the driving connection and thereby of the relative speeds of the feeder and conveyor following such shut down.

A still further object of the invention is to provide apparatus of the class described having means for shutting off the drive means each time that a predetermined cumulative weight of material has been moved by the weigh scale conveyor.

Various other objects and advantages of the apparatus will be apparent to those skilled in the art having reference to the disclosure herein.

BEST MODE OF CARRYING OUT THE INVENTION

Figure 1:
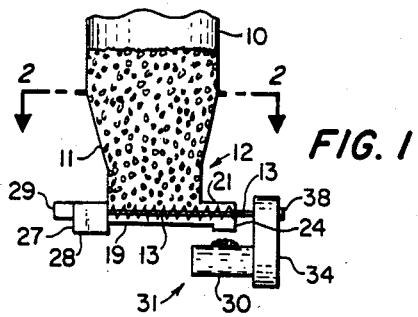
FIG. 1 is a small scale semidiagrammatic fragmentary side view, partly in vertical section, of a storage container associated with the apparatus of the present invention.
Figure 2:
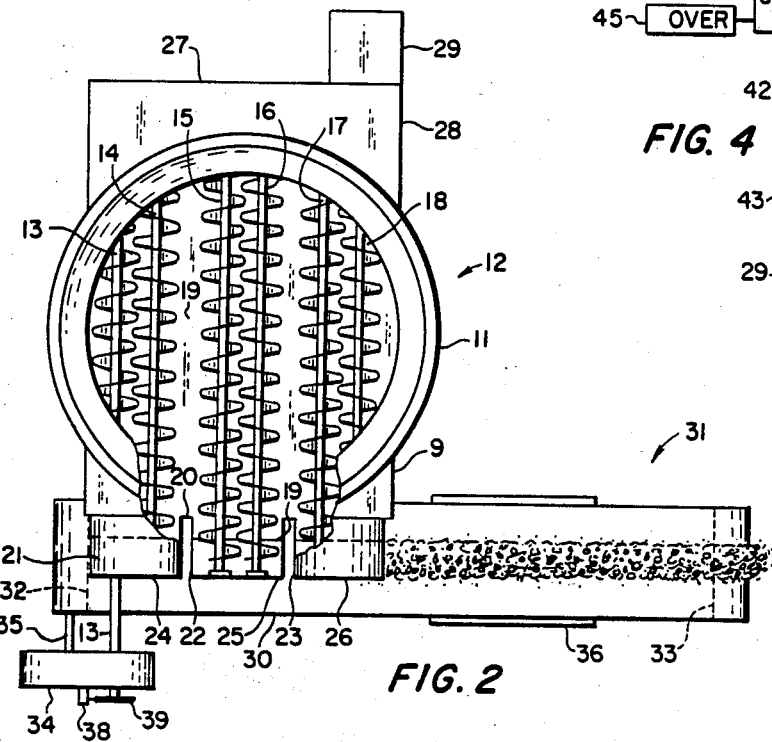
FIG. 2 is a sectional plan view on an enlarge scale taken along the line 2—2 of FIG. 1 and rotated 90° in a clockwise direction.
Figure 3:
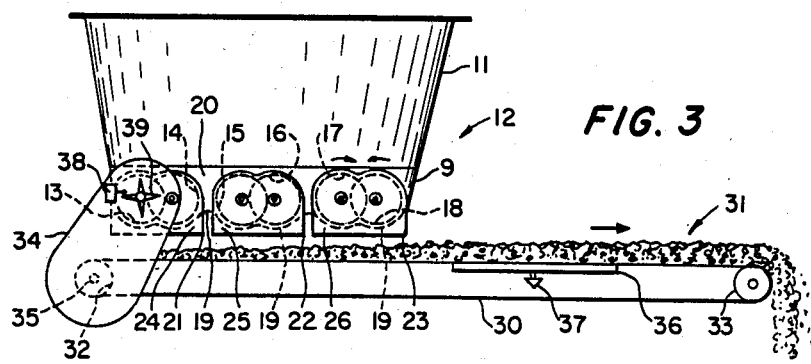
FIG. 3 is a side view of the apparatus shown in FIG. 2.

Referring now to FIG. 1 of the drawing, the numeral 10 indicates a container, such as a large cylindrical storage bin or silo, having an outwardly flanged lower end to which is attached the similarly flanged upper end of the hopper 11 of a feeder 12. The hopper 11 may be tapered as shown, and extending generally horizontally across the reduced diameter bottom portion thereof are one or more pairs of interengaging helical screw type feeder elements. In FIGS. 2 and 3 three pairs of feeder elements 13 and 14, 15 and 16, and 17 and 18 are shown. The bottom wall 19 of the hopper 11 conforms to the shape of the feeder elements 15 to 18 as shown in broken lines in FIG. 3. These feeder elements project horizontally beyond the reduced diameter lower portion of the hopper 11, and through a horizontal extension 9 of the latter having a front wall 20 suitably apertured to permit passage therethrough of said elements.

Projecting from the front wall 20 of extension 9 are three housing or shroud members 21, 22, and 23 which respectively enclose the projecting front end portions of cooperating pairs of feeder elements. As shown in FIG. 3, the housing 21 encloses elements 13 and 14, housing 22 encloses elements 15 and 16, and housing 23 encloses elements 17 and 18. The housings 21 to 23 have vertical front walls 24, 25, and 26, respectively, and the hopper bottom wall 19 extends into the housings 21 to 23, terminating at an intermediate point spaced from the front walls thereof to provide a downwardly facing discharge opening in each housing.

As shown in FIG. 2 the helical screw portion of each feeder element terminates at about the middle of the front-to-rear dimension of the discharge opening associated therewith. The front ends of the shafts of the feeder elements 13 to 18 are suitably journalled in bearings carried by the front walls of the extensions 21 to 23 within which they respectively project.

The rear ends of the feeder elements 13 to 18 project into and are suitably journalled in bearings carried by the rear wall 27 of a drive box 28 mounted at the rear side of the lower portion of hopper 11 as shown. A variable speed dc motor 29 is drivingly connected to the elements 13 to 18 through suitable drive means (not shown) in box 28 and which may take the form of pulleys and drive belts. The drive means is such that each element of a given pair of cooperating feeder elements is driven in a direction of rotation opposite from that of its cooperating element. The helical screw portion of each element of a given cooperating pair interengages with and is of the opposite hand from that of the other, so that when said elements are driven as indicated, a specific volume of material is moved toward the discharge opening for each revolution.

Positioned closely subjacent the discharge openings of housings 21 to 23 in a position to receive material discharged therefrom is the conveyor 30 of a continuous weigh scale 31. In the embodiment of the invention illustrated, the conveyor 30 takes the form of an endless belt trained around a pair of suitably spaced rollers 32 and 33.

An adjustable speed ratio driving interconnection is provided between the feeder 12 and the conveyor 30 which, in the illustrated embodiment, is disposed in a drive box 34 into which the shaft of feeder element 13 projects, as does a shaft 35 coaxially integral with roller 32. The driving interconnection may comprise a pair of pulleys and a belt (not shown), by which the conveyor 30 is driven at a predetermined constant speed with respect to the feeder elements 13 to 18. A given change in the relative speeds of the feeder elements and the conveyor can be selectively effected, for example, by an appropriate manual change in the size of the pulleys in the drive box 34.

The upper extent of the conveyor belt 30 overlays a suitably mounted weighing platform 36 having associated therewith weight sensing means indicated diagrammatically at 37. The weighing platform 36 is close to but offset laterally from the portion of the upper extent of the belt 30 on which material discharged from feeder 12 is deposited. The illustrated sensor 37 may take the form of an weight resposive transducer which is connected to a suitable source of electrical energy (not shown) and is capable of providing a continuous analog signal which is proportional to the weight sensed thereby. A weight transducer which has been found to work satisfactorily for the purposes of the present invention is Model No. FT655, available from Kavlico Inc., 20869 Plummer Street, Chatsworth, CA 91311.

Means is provided for generating pulsed electrical signals in timed relation with the operation of the feeder 12 and conveyor 30. In the illustrated embodiment of the invention this means takes the form of a switch 38 mounted on the drive box 34 in position to be actuated by the arms of a rotary actuator 39 carried on the front end of the shaft of feeder element 13 which projects through the front wall of the drive box 34. Switch 38 is connected to a suitable source of electrical energy (not shown), for example a source of five volts dc.

Figure 4:
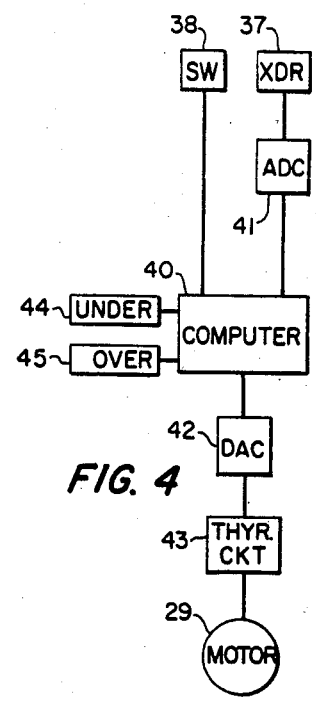
FIG. 4 is a block diagram of control circuit for the apparatus of the present invention.

Control means is provided to vary the speed of the motor 29 responsive to small changes in the weight sensed by the weigh scale 31. In the illustrated embodiment of the invention this control means takes the form of the electrical circuit shown in block diagram form in FIG. 4, wherein the numeral 40 indicates a computer which includes a central processing unit, some memory and input/output circuits such as may be provided in a conventional home computer, for example the Commodore 64 available from Commodore Business Machines, Inc., Wayne, PA 19087.

An analog-to-digital converter (ADC) 41 is connected in circuit between the transducer 37 and the computer 40 and converts the analog signal from the transducer 37, for example a 4.75 volt dc signal, to digital signals which are supplied to the computer. A digital-to-analog converter (DAC) 42 is connected in circuit between the computer 40 and a thyristor dc motor control circuit 43, the latter being connected to a suitable source of dc electrical energy (not shown) as well as to the motor 29, The motor control circuit 43 may take the form of the thyristor dc motor control card Model No. TRB.5P sold by Electroniksystems AB, 13548 Tyresoe, Sweden.

The DAC 42 converts digital signals from the computer 40 into an analog signal usable by the thyristor control circuit 43 to control the dc electrical energy flow to motor 29. The switch 38 is connected to the user port of computer 40. The ADC and DAC 41 and 42 may be mounted on a single board which also carries a programmable read only memory (PROM, not shown), said board being plugged into the computer's expansion port. Associated with the computer 40 is message communicating means in the form of display units 44 and 45 which respectively indicate under and overweight conditions and the need to change the speed ratio of the drive box 34, as will more fully appear hereinafter.

In normal operation of the apparatus of the present invention, the motor 29 drives all of the elements 13 to 18 of the feeder 12 at the same predetermined speed, and through the driving connection to the conveyor 30, the latter is driven at a predetermined speed with respect to the feeder. Because of the proximity of the belt 30 to the discharge openings of feeder 12, material from the feeder is deposited gently on the belt 30 at a point close to, but offset laterally from the weighing platform 37. A precise volume of material per unit time is supplied to the conveyor 30 by feeder 12, and the desired precise weight of material per unit time is delivered off the discharge end of conveyor 30.

The transducer 37, under such condition, supplies an analog signal of, for example 4.75 volts to the ADC, which converts such signal to digital signals which are supplied to the computer 40. The switch 38 is actuated each time an arm of actuator 39 rotates therepast, so that a succession of timed 5 volt dc pulses is supplied to the computer 40, along with the digital signals from the ADC.

The time interval between successive actuations of switch 38 is a measure of the distance the conveyor belt 30 travels during such interval, as well as a measure of the speed of movement of said belt. The computer 40 measures the time of each such interval and totals the time of all of such intervals during a given run.

For a selected nonfree-flowing material to be dispensed at a selected precise weight per unit time, appropriate pulleys are used in the drive box 34 to afford the necessary relationship between the speed of the feeder 12 and the speed of the conveyor 30, and the motor 29 is driven at the speed required for the conveyor 30 to dispense the aforementioned weight per unit time of material. In order to determine the calibration constant required for the apparatus continuously to dispense the desired precise weight of particulate material per unit time, irrespective of changes in the bulk density of such material, a calibration program is undertaken.

During a calibration program the motor 29 is run at constant speed, and 101 successive switch actuations are counted, during which the conveyor belt 30 is moved 100 times the distance moved during one interval between successive actuations. The computer 40 totals the number of digital signals received from the ADC during each of the 100 successive intervals, the number of such signals per interval being proportional to the weight of material sensed by the transducer 37 during the respective intervals, and the computer determines, for the 100 intervals, the average number of signals per interval. The material dispensed by conveyor 30 during the 100 intervals is weighed, and this total weight value in kilograms is used as an input to the computer 40, which then determines the weight of material dispensed during an interval of such length that the number of digital signals produced therein is that previously determined by the computer 40 to be the average. This weight of material per unit time becomes the calibration constant and is thereafter normally dispensed by the apparatus during each interval between successive switch actuations, regardless of changes in bulk density of the dispensed material, within certain limits, as will hereinafter become apparent.

In order to describe the functioning of the computer control system, it will be assumed that during operation of the apparatus there is an increase in the bulk density of the material from container 10 delivered by feeder 12 to conveyor 30. This increase results in a higher weight being sensed by the transducer 37, in response to which the voltage of the analog signal supplied thereby to the ADC 41 is correspondingly increased, for example from 4.75 to 4.85 volts.

The computer 40 compares the resulting signals it receives from ADC 41 during one interval between successive switch actuations to those it received during one of such intervals when the signal from the transducer 37 was 4.75 volts, and it instantaneously supplies a signal to the DAC 42 which results in the thyristor control 43 reducing the voltage supplied to motor 29. The speed of motor 29, and thereby of the feeder 12 and conveyor 30, is instantly reduced sufficiently to cause such heavier material to be dispensed by the conveyor 30, at the calibration constant weight per unit time.

If it should then occur that there is a decrease in the bulk density of the material from container 10 delivered by feeder 12 to conveyor 30, for example sufficient for the signal supplied by transducer 37 to be correspondingly decreased from the 4.85 volt level to 4.65 volts, the computer 40 makes the comparisons aforenoted, and instantly supplies a signal to DAC 42 which results in an instant increase in the speed of motor 29, feeder 12, and conveyor 30. The amount of the increase is sufficient to cause such lighter material to be dispensed by conveyor 30 at the calibration constant weight per unit time. The signal output of transducer 37 remains at the 4.65 volt level so long as bulk density of particulate material does not change.

The computer 40 is programmed so that it is capable of causing operation of the motor 29 through a range of speeds between a predetermined minimum and a predetermined maximum responsive to changes in weight sensed by the transducer 37. If the bulk density of the particulate material passing out the weighing platform 36 is such that, responsive thereto the control system causes the speed of the motor to reach either the minimum or maximum predetermined speed, and transducer 37 still senses an underweight or overweight condition such that the signal thereof reaches, for example, 4.5 or 5.0 volts, then the computer shuts off power to the 29. When this happens, the computer generates a signal which causes the appropriate one of the displays 44 and 45 to be illuminated to indicate that the reason for the shut down was the particular overweight or underweight condition, as well as to indicate the need for an appropriate adjustment of the speed ratio of the drive box 34.

Adjustment of the speed ratio of drive box 34 can be accomplished by manual changing of one or more pulleys therein, and such change is effective to either reduce or increase the speed of the conveyor 30 with respect to that of the feeder 12. In the case of an overweight shut down, the appropriate pulley change is one which speeds up the conveyor 30 relative to the feeder 12, so that a thinner layer of the heavier particulate material is deposited on the conveyor by the feeder. Conversely, when the shut down is caused by an underweight condition, the appropriate pulley change is one which slows down the conveyor 30 relative to the feeder 12, so that a thicker layer of the lighter particulate material is deposited on the conveyor. After the appropriate pulley change, the weight sensed by the transducer 37, upon start up of the motor, will again be such that the transducer signal is within its normal operating range, for example between 4.65 and 4.85 volts, and the control system will thereafter cause the apparatus to dispense the particulate material at the selected precise weight per unit time, regardless of changes in bulk density of the material dispensed, so long as such changes do not cause shut down.

The apparatus of the present invention can be used, not only for dispensing of material on a continuous basis at a specific weight of material per unit time, but it can also be used to dispense a specific total weight of material, after which dispensing is stopped. For operation in the latter mode the computer is programmed for a selected specific total weight, and the motor 29 is started. The computer causes the motor to operate at a specific relatively rapid rate, and keeps a running total of the weight of material dispensed during each interval between successive switch actuations of the run, and compares that total with the selected total weight for which the computer is programmed. When the total weight of dispensed material counted by the computer reaches the selected total weight, less the amount dispensed during one interval between successive switch actuations, the computer stops the motor.

When the apparatus is operated in the total weight mode just described, the total weight dispensed can vary by the amount dispensed during one switch actuation time interval. In order to more precisely control the accuracy of the total weight dispensed during a given run, all that is necessary is to reduce the length of the time interval between successive switch actuations. This can be accomplished, for example, by substituting for the actuator 39, an actuator having a greater number of actuating arms. The resulting reduction in the length of time interval between successive switch actuations correspondingly reduces the weight of material dispensed per time interval. The greater these reductions, the greater the accuracy of the total weight dispensed during a given run. It is understood, of course, that the switch 38 and actuator therefore 39 in the disclosed embodiment are only illustrative, and that any suitable and desired switch means, including photoelectric and electronic, may be substituted therefor as will produce the desired precision.

It will be apparent that the apparatus of the present invention is capable of dispensing nonfree-flowing particulate material from a large container, such as a bulk storage bin or silo, at a high or low rate and at a precise weight per unit time, whether on a continuous or a total weight basis.

For each revolution of the feeder elements 13 to 18 a specific volume of material is deposited thereby on the conveyor belt 30. Since the belt 30 is driven at a specific speed relative to the feeder elements, the belt 30 always moves the same volume, i.e. thickness, of material during each interval between successive switch actuations. If any weight change is sensed by transducer 37 as a result of a change in the bulk density of the particulate material, the control system instantly changes the motor speed as necessary to cause the precise desired weight per unit time of the heavier or lighter material to be dispensed by the conveyor 30. Since changes in bulk density usually occur slowly, and the weight of material moved by the belt 30 during an interval between successive switch actuations can be any selected weight, for example 30 to 80 grams, the control system is capable of causing apparatus to dispense nonfree-flowing material with high precision at any selected weight per unit of time.

The ability to change the speed of the belt 30 with respect to that of feeder 12 makes it possible to avoid reduction in accuracy due to error in the transducer 37. Typically, the accuracy of the transducer is highest when sensing weights near the upper end of its weight sensing range. Therefore, when the particulate material to be dispensed is one which has relatively low bulk density, it is advantageous to select a speed ratio in drive box 34 such that the belt 30 runs relatively slowly with respect to the speed of the feeder 12, and a sufficiently large volume of the lighter weight particulate material is deposited on the belt by the feeder to cause the weight sensed by the transducer 37 to be near the upper end of its weight sensing range. This insures that the transducer operates with maximum accuracy.

Another factor contributing to the high accuracy of the present apparatus is the fact the feeder 12 and conveyor 30 are positioned so that the particulate material from container 10 is gently deposited by the feeder 12 onto the conveyor belt. Thus the belt 30 can be made of thin, flexible total permitting highly accurate sensing of the material on the portion of the belt overlaying the weighing platform 36. If the belt 30 were subjected to substantial impact of material thereon, it would have to be made of relatively thicker metal which would have substantially less flexibility and would contribute a corresponding amount of weighing error.

The present invention can provide industry with a low cost means for continuous mixing or blending or nonfree-flowing materials at precise weights per unit time. For example a product composed of three non-free-flowing particulate ingredients can be produced on a continuous basis by using apparatus of the present invention associated with the bulk storage container for each of the ingredients. Each apparatus dispenses, on a continuous stream basis, a precise desired weight per unit time of one of the nonfree-flowing ingredients. The three ingredient streams can be brought together to provide, in the blended stream, a product which is precisely compounded on a weight basis. Depending upon the ingredients, the product stream can be continuously supplied to an industrial process, directed toward a packaging operation, or, in an agricultural environment, it can provide a precisely weight controlled blend of feed for farm animals.

The production of a continuous blended stream with the apparatus of the present invention as described avoids the disadvantage inherent in the use of batch compounding and handling, and does so at reduced cost. For example, in the case wherein the ingredients in a batch are of different weights and tend to separate, even if sophisticated agitation methods are used, when part of the batch is removed, the weight ratio of the ingredients of the part removed will differ from that of the remainder of the batch. Moreover, agitation used to minimize separation, as well as that which is incident to weighing, repeated batch transport and the like, tends to undesirably break down fragile materials. The gentle handling of materials by the apparatus of the present invention is particularly advantageous in the production of food products, such as those including flaked cereal ingredients, since the integrity of the flake structure is important to the digestion of such products.

The invention also makes possible major cost savings for those industrial applications wherein the use of water as a vehicle for the addition of certain nonfree-flowing materials to industrial processes has been resorted to because of the unavailability of means for dispensing such materials in dry from on a continuous precisely weight controlled basis. The use of a water vehicle has become so common that suppliers of such materials often deliver them in solution or suspension. Where this is done, the cost of transporting the water used, as well as the cost of removing that water in later stages of processing, is very substantial. By making nonfree-flowing materials available in dry form on a continuous weight controlled basis, the present invention permits the addition of such materials to industrial processes in that form, and thereby saves both transport and processing costs.

Other advantages of the invention, as well as various changes or modifications in the illustrated embodiment will become apparent to those skilled in the art, and all of such changes are contemplated as will come within the scope of the appended claims.

What is claimed as the invention is:

1. Apparatus useful for dispensing from a bulk storage bin or silo a predetermined weight per unit time of nonfree-flowing particulate material, comprising feeder capable of continuously discharging directly from a bulk storage bin or silo a constant predetermined volume per unit time of nonfree-flowing material; a continuous weigh scale having a conveyor positioned to receive material discharged by said feeder; variable speed drive means for driving said feeder and conveyor at predetermined relative speeds, said drive means comprising an interconnection between said feeder and conveyor which maintains the speed ratio therebetween substantially constant irrespective of the speed at which they are driven by the drive means; and control means connected to said weigh scale and drive means and operable to vary the speed of said drive means, and thereby of the feeder and conveyor, responsive to small changes in weight of material sensed by the weigh scale.

2. In combination, a feeder capable of continuously discharging directly from a bulk storage bin or silo a predetermined constant volume per unit time of non-free-flowing material; a continuous weigh scale having a conveyor positioned to receive material discharged by said feeder; and variable speed drive means for driving said feeder and conveyor at predetermined relative speeds, said drive means comprising an interconnection between said feeder and conveyor which maintains the speed ratio therebetween substantially constant irrespective of the speed at which they are driven by the drive means.

3. The apparatus of claim 1 or 2 wherein said drive means comprises a variable speed motor having a driving connection to both the feeder and the conveyor.

4. The apparatus of claim 1 or 2 wherein said drive means comprises a variable speed motor having a direct driving connection to one of said feeder and conveyor, the other being driven through said interconnection.

5. The apparatus of claim 1 or 2 wherein said drive means comprises a variable speed motor having a direct driving connection to one of said feeder and conveyor, the other being driven through said interconnection, said interconnection being selectively adjustable to vary the speed ratio between the feeder and conveyor.

6. The apparatus of claim 1 or 2 wherein the feeder comprises at least one pair of interengaging helical screw-type feeder elements.

7. The apparatus of claim 1 or 2 wherein the conveyor comprises a thin and flexible endless belt having a material-carrying extent, the weigh scale additionally comprises a weighing platform which is overlaid by said conveyor belt extent, and the conveyor is so positioned with respect to the feeder that material discharged from the feeder is gently deposited on said conveyor belt extent at a point closely adjacent but offset from the weighing platform.

8. Apparatus as in claim 1 wherein said drive means comprises a variable speed motor having a direct driving connection to one of said feeder and conveyor, the other being driven through said interconnection; said interconnection being selectively adjustable to vary the speed ratio between said feeder and conveyor; the control means comprises means for terminating operation of the drive means whenever the weight sensed by the weigh scale varies from a preselected weight by a predetermined limited amount; there is means for generating a first or a second signal upon shut-off of the drive means responsive, respectively, to a predetermined underweight or overweight condition; and message generating means effective upon generation of the first signal to indicate the need for predetermined adjustment of the interconnection in one sense, and effective upon generation of the second signal to indicate the need for a predetermined adjustment of the interconnection in the opposite sense.

9. Apparatus as in claim 1 wherein the control means comprises means for shutting off the drive means each time that a predetermined cumulative weight of material has been dispensed by the conveyor.

10. The apparatus of claim 1 wherein said drive means comprises a variable speed motor having a direct driving connection to one of said feeder and conveyor, the other being driven through said interconnection; a motor control circuit is connected to said motor and a source of electrical energy; the weigh scale comprises means including a weight sensing transducer and an analog/digital converter for generating a first intermittent electrical signal which varies with changes in weight sensed; there is second intermittent signal generating means comprising a switch connected to an electrical source, and means for actuating the switch intermittently in timed relation to operation of the feeder and conveyor; and said control means is electrically connected to said first and second signal generating means and the motor control circuti and supplies controlling electrical signal to the motor control circuit responsive to changes in the first signal relative to the second signal, the control means shuts off the drive motor whenever the weight sensed by the transducer varies from a preselected weight by a predetermined limited amount; there is means associated with the control means for generating a first or a second shut-off signal upon shut-off of the drive motor responsive, respectively, to a predetermined underweight to overweight condition, and message generating means associatd with the shut-off signalsignal generating means and responsive to generation of th first shut-off signal to indicate the need for a predetermined adjustment of the interconnection in one sense, and responsive to generation of the second shut-off signal to indicate the need for a predetermined adjustment of the interconnection in the opposite sense.

11. Apparatus as in claim 1 wherein the control means comprises means for terminating operation of the drive means whenever the weight sensed by the weight of scale varies from a preselected weight by a predetermined limited amount.

12. Apparatus as in claim 11 wherein the control means also comprises means for generating a signal upon shut-off of the drive means responsive to a predetermined underweight or overweight condition.

13. The apparatus of claim 1 wherein the drive means comprises a variable speed electric motor having a control circuit connected to a source of electrical energy, the weigh scale comprises means including a weight sensing transducer for generating a first electrical signal which varies with changes in weight sensed, there is means for generating a second electrical signal which varies with the rate of operation of said feeder and conveyor, and said control means is electrically connected to the first and second signal generating means and to the motor control circuit and supplies controlling electrical signals to the motor control circuit responsive to changes in the first signal relative to the second signal.

14. Apparatus as in claim 13 wherein the control means shuts off the drive motor when a predetermined cumulative weight of material has been dispensed by the conveyor.

15. The apparatus of claim 13 wherein said transducer supplies a continuous analog signal which varies with variation in weight sensed thereby, and said first signal generating means comprises an analog/digital converter for converting said analog signal to a first intermittent signal; the electric motor is a DC motor; and said second signal generating means comprises switch means connected to a source of electrical energy, and means for actuating the switch means intermittently in timed relation to operation of the feeder and conveyor.

16. Apparatus as in claim 15 wherein said second signal generating means comprises means for adjusting the frequency of actuation of the switch means relative to the rate of operation of the feeder and conveyor.

17. The apparatus of claim 13 wherein the control means shuts off the drive motor when the weight sensed by the transducer varies from a preselected weight by a predetermined limited amount.

18. The apparatus of claim 17 wherein there is means associated with the control means for generating a shut-off signal upon shut-off of the drive motor responsive to an underweight or an overweight condition.

19. A method useful for dispensing from a bulk storage bin or silo a predetermined substantially constant weight per unit time of nonfree-flowing particulate material, comprising the steps of continuously discharging directly from a bulk storage bin or silo a constant predetermined volume per unit time of the non-free flowing material; conveying the discharged material across a weigh scale at a constant speed relative to the volume of material discharged per unit time such that a predetermined weight of material is continuously sensed by said weigh scale; and then, responsive to a change in the bulk density of the discharged material and a corresponding change in the weight of material sensed by the weigh scale, and while maintaining constant the relationship of the conveying speed to the volume of material discharged per unit time, simultaneously increasing or decreasing the volume of material discharged and conveyed an amount effective to return the weight of material sensed by weigh scale to said predetermined value, and thereby to maintain the weight of material dispensed per unit time substantially constant.

20. The mtthod of claim 19 which additionally comprises generating a first electrical signal based on the weight of material sensed by the weight scale; generating a second electrical signal based on the volume of said material discharged and conveyed across the weigh scale, and then, whenever the first signal increases or decreases in relation to said second signal, decreasing or increasing, respectively, the volume of material discharged and conveyed an amount effective to return said signals to their initial relationship.

* * * * *

UNITED STATES PATENT AND TRADEMARK OFFICE
CERTIFICATE OF CORRECTION

PATENT NO. : 4,595,125
DATED : June 17, 1986
INVENTOR(S) : S. Tomas Alwerud

It is certified that error appears in the above-identified patent and that said Letters Patent are hereby corrected as shown below:

In the Abstract, line 4, "back" should be --bulk--;

line 8, after "by" insert --a--.

Column 1, line 35, after "motorized" insert -- , --;

line 39, "the" should be --such--.

Column 3, line 41, before "control" insert --the--.

Column 4, line 57, "an" should be --a--, and "resposive" should be --responsive--.

Column 7, line 10, "out" should be --over--;

line 16, before "29" insert --motor--.

Column 8, line 11, "therefore" should be --therefor--;

line 39, before "apparatus" insert --the--;

line 62, "total" should be --metal--.

Column 9, line 2, "or", second instance, should be --of--;

line 42, "from" should be --form--;

line 62, before "feeder", insert --a--.

UNITED STATES PATENT AND TRADEMARK OFFICE
CERTIFICATE OF CORRECTION

PATENT NO. : 4,595,125
DATED : June 17, 1986
INVENTOR(S) : S. Tomas Alwerud

It is certified that error appears in the above-identified patent and that said Letters Patent are hereby corrected as shown below:

Column 11, line 18, "circuti" should be --circuit--;

line 19, "signal" should be --signals--;

line 29, "sociatd" should be --sociated--;

same line, "signal", first instance, should be deleted;

line 30, "th" should be --the--.

Column 12, line 32, "non-free" should be --nonfree- --;

line 49, "mtthod" should be --method--.

Signed and Sealed this

Twenty-first Day of October, 1986

[SEAL]

Attest:

DONALD J. QUIGG

Attesting Officer     Commissioner of Patents and Trademarks